Aug. 23, 1932.   H. C. HARVEY   1,873,585
METHOD OF MAKING TOILET SEATS OF PULP MATERIAL
Filed Jan. 17, 1931   5 Sheets-Sheet 1
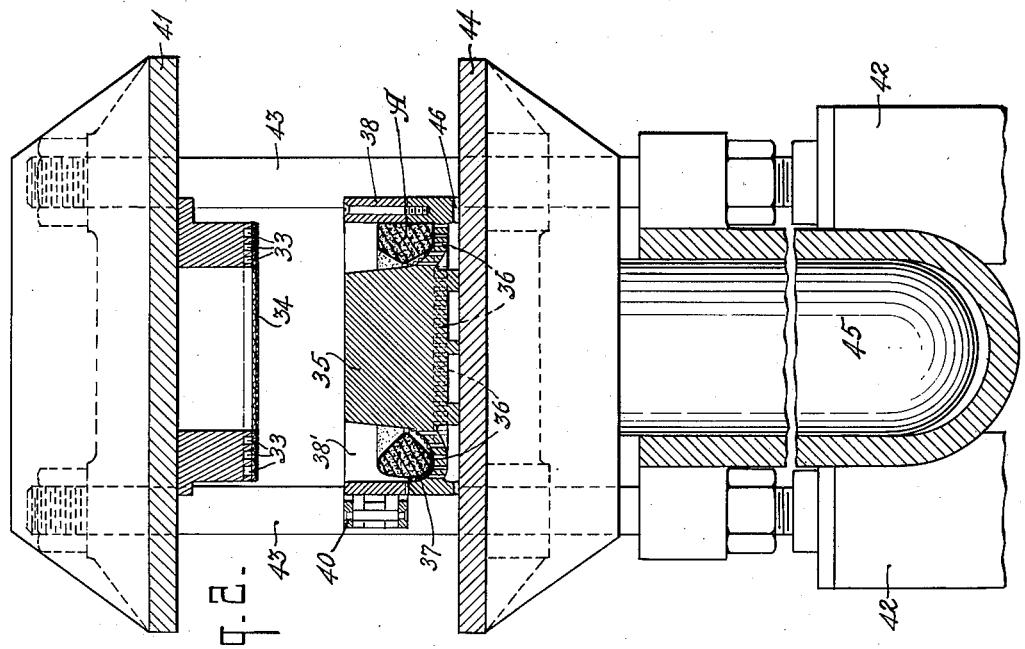
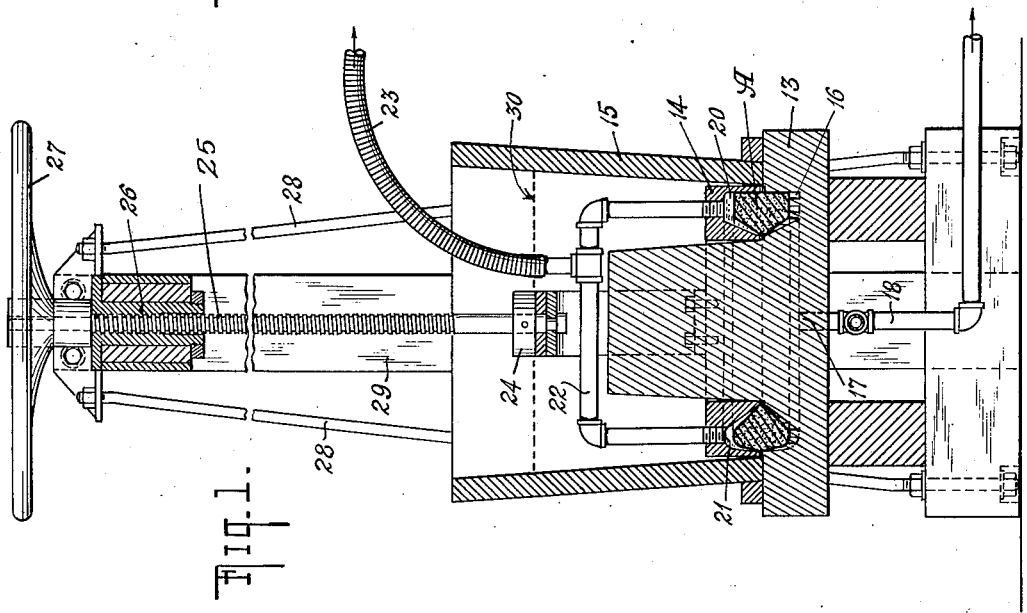
WITNESS
INVENTOR
HAROLD C. HARVEY
BY
ATTORNEYS Aug. 23, 1932.  H. C. HARVEY  1,873,585
METHOD OF MAKING TOILET SEATS OF PULP MATERIAL
Filed Jan. 17, 1931   5 Sheets-Sheet 2
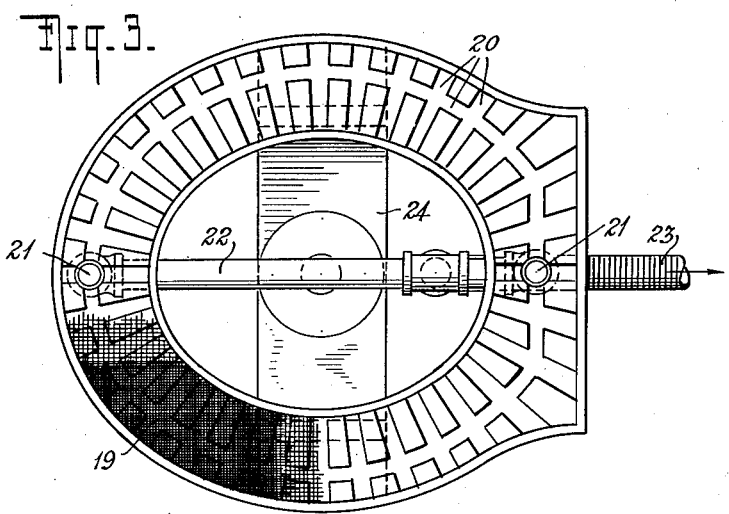
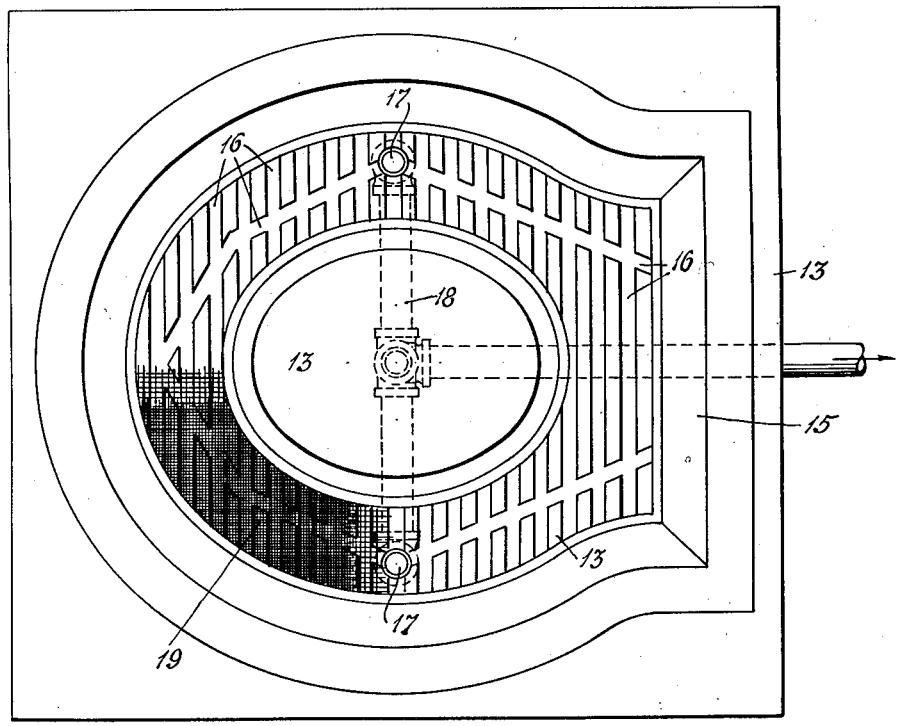
WITNESS
INVENTOR
HAROLD C. HARVEY
BY
ATTORNEYS

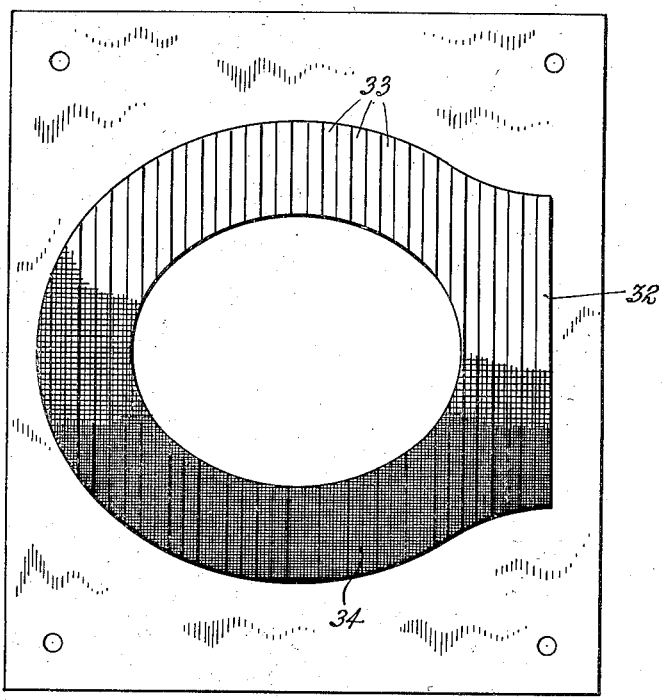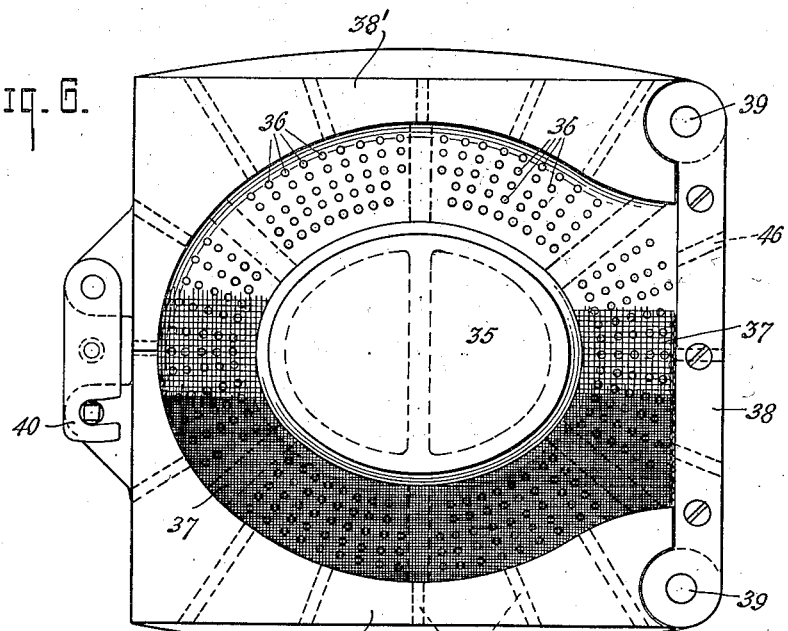

Aug. 23, 1932.    H. C. HARVEY    1,873,585
METHOD OF MAKING TOILET SEATS OF PULP MATERIAL
Filed Jan. 17, 1931    5 Sheets-Sheet 4
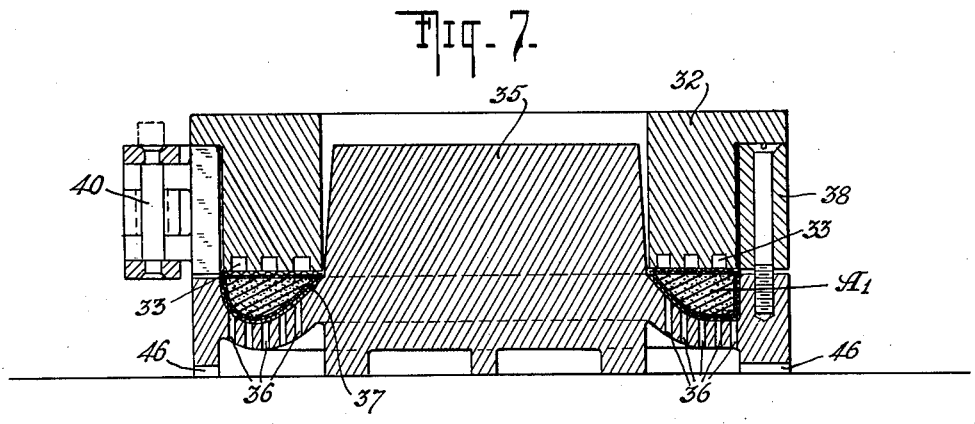
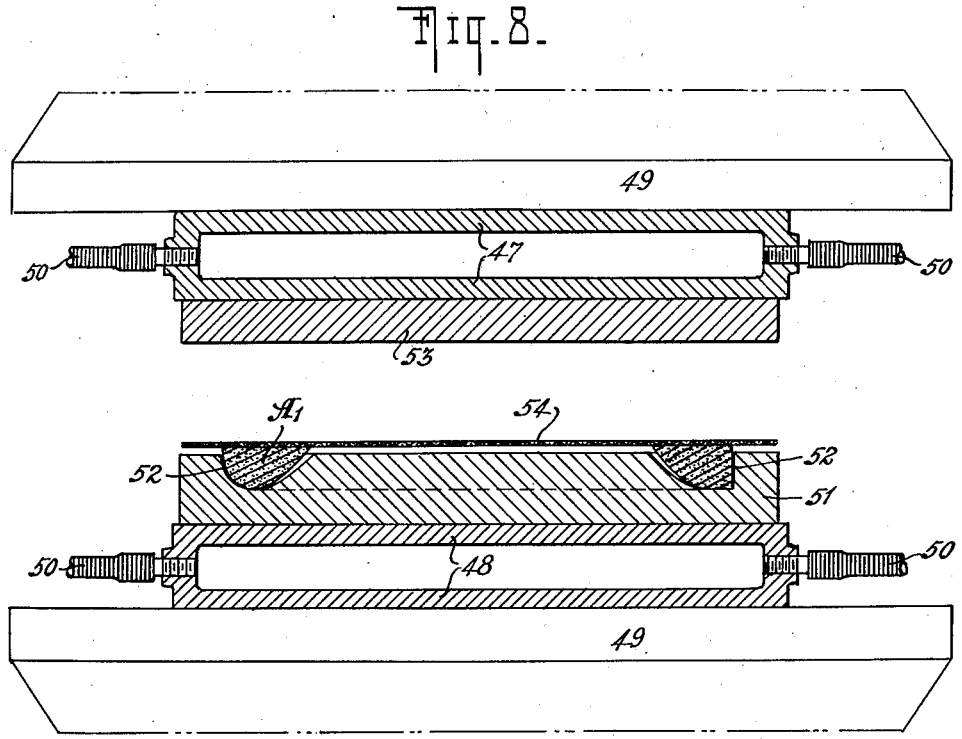
WITNESS
INVENTOR
HAROLD C. HARVEY
BY
ATTORNEYS Aug. 23, 1932.  H. C. HARVEY  1,873,585
METHOD OF MAKING TOILET SEATS OF PULP MATERIAL
Filed Jan. 17, 1931   5 Sheets-Sheet 5
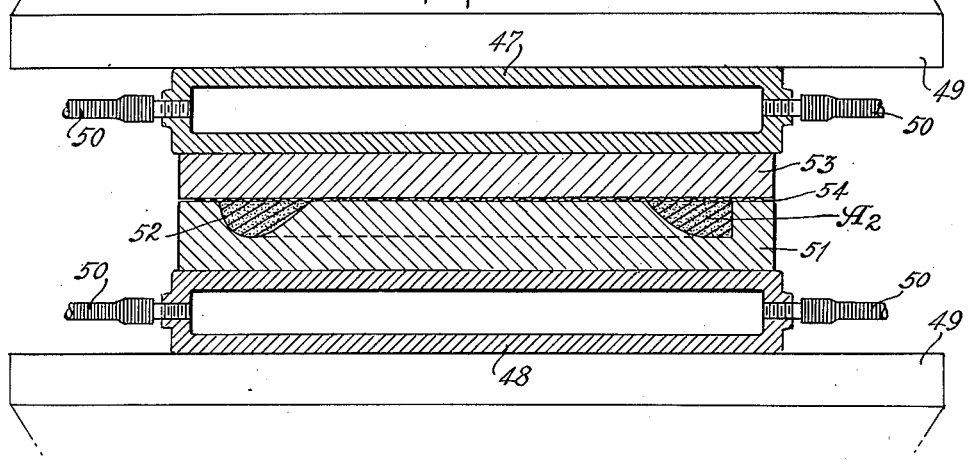
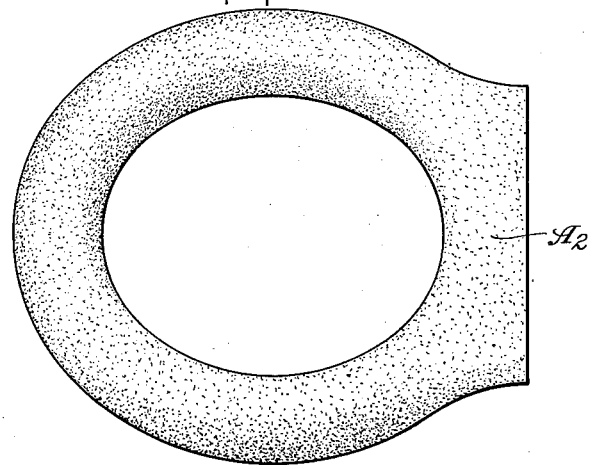
WITNESS
INVENTOR
HAROLD C. HARVEY
BY
ATTORNEYS Patented Aug. 23, 1932

1,873,585

UNITED STATES PATENT OFFICE

HAROLD C. HARVEY, OF TRENTON, NEW JERSEY, ASSIGNOR TO THE AGASOTE MILL-BOARD COMPANY, OF EWING TOWNSHIP, NEW JERSEY, A CORPORATION OF NEW JERSEY

METHOD OF MAKING TOILET SEATS OF PULP MATERIAL

Application filed January 17, 1931, Serial No. 509,363, and in Canada October 31, 1930.

My invention relates to a process of molding toilet seats of paper or other pulp not containing a fluxing binder, and has for its main object the production of cores for such seats whose surfaces are particularly suited by reason of the absence of a fluxing binder for being provided with a uniform coating of vulcanized rubber or other plastic substance which has to be applied to such core under pressure. More specifically, it is the object of my invention to produce such a core of pulp material in such a manner that the density of the material in the finished core is uniform or substantially uniform throughout, so that when the coating is applied thereto under uniform pressure no part of the core is indented or otherwise distorted because it is of less density than other portions of the core. If such a core is not of uniform density and is provided, for instance, with a rubber coating under pressure in a mold, there is great liability of resulting depressions in one or more portions of the surface of the core which will be filled by the molten rubber, thus causing the coating to be thinner in one or more places than it ought to be. As a result, the finished coating is liable to crack in the thinner, i. e. weaker, portions.

In order to accomplish this object, I cast the pulp in a mold of such dimensions and configuration that the resulting casting, which I call the "primary formation" corresponds approximately, insofar as regards its horizontal cross-section, to the finished core which is to be produced therefrom but any and every vertical cross-section thereof shows the upper half congruent with the lower half, that is, if any such vertical cross-section were cut in half by a horizontal line the upper half, if imagined as folded over onto the lower half, would coincide with such lower half. I then compress this "primary formation" first before drying and then after drying in a plurality of presses until the "primary formation" has been given the form of the finished seat, that is to say, is substantially flat on its lower side but curved on its upper side.

Pulp board is usually made by running paper pulp, wood pulp or the like, preferably with an admixture of a suitable binder, into a mold and by means of pressure removing the majority of the water (see, for instance, United States Patents No. 971,936, No. 1,272,566 and No. 1,506,509) and subsequently drying out the remainder of the water by the application of heat, preferably in a suitably constructed drier. The board, after substantially all the water has been removed first by pressure and then by drying, is in what might be termed a spongy condition and is called by me "sponge board" and is then subjected to combined heat and pressure to form a compacted board.

One set of apparatus desirable for use in carrying out my invention is shown in the accompanying drawings, in which Fig. 1 is a vertical view with parts shown in section of the "primary press" in which the "primary formation" is made; Fig. 2 is a vertical cross-section of a "wet press" in which the "primary formation," while still wet, is compressed and one side thereof made flat to form the lower face of the completed core; Fig. 3 is a bottom plan view of the upper portion; Fig. 4 is a plan view of the lower portion and deckle of the primary press shown in Fig. 1; Fig. 5 is a bottom plan view of the upper die used in the wet press shown in Fig. 2, and Fig. 6 is a plan view of the lower die and deckle used in such press; Fig. 7 shows the wet press in Fig. 2 with the upper die in lowermost position and the workpiece provided with its final flat side; Fig. 8 is a vertical cross-section of the platens of a hot press and the final or finishing die ready to compress the workpiece into final shape; Fig. 9 shows the press and die of Fig. 8 in final or closed position with the workpiece completely formed; Fig. 10 is a plan view and Fig. 11 a corresponding vertical section of the final core ready to be coated with a plastic composition such as rubber; and Fig. 12 is a cross-section corresponding to Fig. 11 of the core coated with rubber or other plastic material.

The primary press

This press and its parts are illustrated in Figs. 1, 3 and 4. The press has a lower mold portion 13, an upper mold portion 14 and a deckle 15. The lower die portion 13 is shown in greater detail in Fig. 4, and the upper die portion is shown in greater detail in Fig. 3. The lower die portion 13 is provided with a number of channels 16 so arranged that any water collecting therein may flow through one or more openings 17 into pipe system 18 and thence to the atmosphere. Above the channels is provided a double layer of wire netting 19 having a coarse and a fine mesh, a portion of which is shown in Fig. 4, whose meshes are large enough to permit water to flow therethrough but not large enough to permit the passage of the pulp fibres which are to be shaped in the die.

The upper die portion 14 is similarly provided with wire netting 19 and with a number of channels 20 so arranged that water may be withdrawn therethrough through one or more openings 21 and pipe system 22 and pass through conduit 23 connected directly or indirectly to a suction apparatus.

The upper die 14 is connected by means of a straddle block 24 to a device suitable for raising and lowering the upper die, such as a screw-threaded shaft 25 mounted in collar 26 and adapted to be rotated by wheel 27. Tie rods 28 and frame 29 may be provided if it is desired to construct the press so that it may readily be moved as a unit.

The operation of this press is as follows:

The upper die and its associated pipe system 22—23 is raised by means of block 24, screw-threaded shaft 25 and wheel 27 until the upper portion of the upper die is about on a level with the top of the deckle 15. A mixture of pulp, for instance, digested wood fibre and water, such as used in the manufacture of pulp board, is run into the deckle, for instance, up to the level indicated by the arrow 30. Suction is then applied to conduit 23 and preferably also to pipe system 18, thus causing the water to be sucked out of the pulp mixture and pulp material to be deposited against the wire meshing of the upper die and of the lower die. As the liquid held in deckle 15 recedes, the upper die is gradually lowered, preferably at such a rate of speed that the top of such die is on a level at all times with that of the pulp mixture. When the two die portions have come together so that no further downward motion of the upper mold is possible, the suction through both dies is continued for a short time so as to remove whatever water can still be removed from the pulp mixture. The pipe system 18 is then opened to the atmosphere and the upper die raised. As the suction through conduit 23 continues, the formed article A is carried up, away from the lower die. The deckle 15 is now removed, the suction through conduit 23 stopped and the released "primary formation" piece A is caught as it drops downwardly and carried over to the wet press.

*Wet press*

This press is illustrated in Figs. 2, 5, 6, and 7, Fig. 2 showing the press in open position just after it has received the "primary formation," Fig. 5 showing a bottom plan view of the upper press portion, Fig. 6 a plan view of the lower press portion and its surrounding deckle, and Fig. 7 the two portions of the press at the completion of the pressing operation.

The upper die 32 is provided with a number of channels 33 covered by a wire mesh 34, a portion only of which is illustrated in Fig. 5. The channels are open at their ends so as to permit the escape of any water which may pass into such channels through the wire netting 34.

The lower die 35 is provided with apertures 36 covered with wire netting 37, a portion only of which is shown in Fig. 6. The upper portion of the lower die is arranged in the form of a deckle having a stationary back portion 38, the two halves 38' and 38" of such deckel being hinged at 39—39 and provided with a locking means 40.

The upper die 32 may be firmly attached to a head support 41 held in fixed relation to base 42 by standards 43.

The lower die 35 rests on a support 44 arranged to slide on standards 43 and adapted to be raised by a hydraulic ram 45.

The "primary formation" A as it comes from the wet press of Fig. 1 and still containing a large proportion of water, is placed into the lower die 35 when the press is in the open position illustrated in Fig. 2, the deckle portion of such lower die being in the closed position shown in such figure. By means of the hydraulic ram 45 the lower die 35 is then pushed upwardly until it comes into full contact with the upper die 32 and the parts are in the position shown in Fig. 7. By this operation the "primary formation" is given substantially its final outline A', that is to say, the pulp while still moist is compressed until the upper portion of the formed piece is entirely flat and the upper surface is larger than any corresponding horizontal cross-section of the formed piece; thus, each line representing a vertical element of the piece has been reduced by about one-half or, in other words, the upper half of the "primary formation" has been pushed into the interstices of the lower half. The water, which is crowded out by the compression process, flows out through channels 33 and apertures 36. Channels 46 are provided in the lower portion of the lower die in order to permit the escape of water which has passed through apertures 36.

*The drying step*

The press having been opened, the deckle 38', 38" is opened and the pressed piece A₁ is removed from the lower die. Such piece is then placed into a drying oven (not shown) for about two or three days and kept at a temperature of about 125° F. until it is substantially bone dry.

The hot press

This press is illustrated in Figs. 8 and 9. It consists of an upper hollow platen 47 and a lower platen 48, each platen attached to a suitable support 49—49 provided with suitable mechanism (not shown) for causing the platens to move toward and away from each other. Conduits 50—50 connect the hollow interior of each platen with a source of steam supply. The lower platen 48 is provided with a metal die 51 having an annular depression 52 whose configuration is that which is to be given to the pressed core piece and which is of a depth slightly less than the corresponding vertical section of such pressed piece. The upper platen 47 may be provided with a metal press plate 53.

The pressed piece $A_1$ is placed into the depression 52 when the press is in the open position shown in Fig. 8 and a wire screen 54 is laid on such piece to prevent sticking of the piece to the press plate 53. Steam of a temperature of about 300° F. is caused to flow into the interiors of the platens through conduits 50 and the press is then closed as shown in Fig. 9, the wet pressed piece $A_1$ assuming the outline of the channel 52 and becoming the hot pressed piece $A_2$. The hot press is then opened and the piece $A_2$ removed.

If desired, the finished piece may then be buffed or otherwise surface treated, the final treatment depending upon the nature of the coating which is to be placed thereon.

The finished core piece is shown in plan view in Fig. 10 and in cross-sectional view in Fig. 11. After coating, for instance, with rubber, the completed seat will have the cross-section shown in Fig. 12. As shown in such figure, the coating is even throughout. If such coating has been applied under pressure in a mold, the uniformity of the depth of the coating is due to the fact that the core is of substantially uniform density throughout or what is the practical equivalent of uniform density, it has presented a uniform resistance to the mold pressure throughout.

Summary

The fibres of the initial pulp mixture have passed through the following steps to form the completed core piece suitable for coating under pressure:

1. In the wet press the larger proportion of the water was removed and the pulp shaped to the "primary formation" which, roughly speaking, was twice the size of the finished core piece, the lower half having approximately the outline of such finished core piece and the upper half being congruent with the lower half.

2. The "primary formation" was then placed into the wet press in which it was shaped into the general outline of the finished core piece, i. e., the two congruent portions were compressed while almost all of the remaining water was removed, substantially to the size of one of such congruent portions only, thus forming the wet pressed piece.

3. The wet pressed piece was dried to substantially bone dryness in a suitable oven.

4. The dry piece was shaped to final form between hot platens in a suitable die.

5. The finished core piece was buffed or otherwise surface finished.

I claim:

1. In the method of forming a core piece for a coated toilet seat the steps which comprise shaping wet pulp into a primary formation consisting of two congruent integral halves, one half having approximately the shape of the desired completed core, and then compressing such primary formation (while still wet) into substantially the form of such desired core piece.

2. In the method of forming a core piece for a coated toilet seat the steps which comprise shaping wet pulp into a primary formation consisting of two congruent integral halves, one half having approximately the shape of the desired completed core, compressing such primary formation (while still wet) into substantially the form of such desired core piece, drying said core piece and pressing the same into its finished form.

3. In the method of forming a core piece for a coated toilet seat the steps which comprise shaping wet pulp intermingled with a nonfluxing binder into a primary formation consisting of two congruent integral halves, one half having approximately the shape of the desired completed core, and then compressing such primary formation (while still wet) into substantially the form of such desired core piece.

HAROLD C. HARVEY.